(12) United States Patent
Ichino et al.

(10) Patent No.: US 8,506,848 B2
(45) Date of Patent: Aug. 13, 2013

(54) SEMIELECTROCONDUCTIVE POLYIMIDE RESIN BELT AND PROCESS FOR PRODUCING SEMIELECTROCONDUCTIVE POLYIMIDE RESIN BELT

(75) Inventors: Akira Ichino, Moriyama (JP); Naoki Nishiura, Konan (JP); Takashi Kuraoka, Moriyama (JP)

(73) Assignee: Gunze Limited, Kyoto (JP)

( * ) Notice: Subject to any disclaimer, the term of this patent is extended or adjusted under 35 U.S.C. 154(b) by 352 days.

(21) Appl. No.: 12/734,874

(22) PCT Filed: Nov. 27, 2008

(86) PCT No.: PCT/JP2008/071580
§ 371 (c)(1),
(2), (4) Date: May 28, 2010

(87) PCT Pub. No.: WO2009/069715
PCT Pub. Date: Jun. 4, 2009

(65) Prior Publication Data
US 2010/0329751 A1    Dec. 30, 2010

(30) Foreign Application Priority Data

Nov. 30, 2007  (JP) .................. 2007-310633

(51) Int. Cl.
*H01B 1/04* (2006.01)
*H01B 1/24* (2006.01)
*G03G 15/00* (2006.01)

(52) U.S. Cl.
USPC ........... 252/511; 399/303; 399/162; 399/313; 399/396; 264/311

(58) Field of Classification Search
USPC ................ 252/500, 511; 399/303, 162, 313, 399/396; 264/311
See application file for complete search history.

(56) References Cited

U.S. PATENT DOCUMENTS

| | | | |
|---|---|---|---|
| 5,272,247 A | 12/1993 | Sotokawa et al. | |
| 6,101,360 A | 8/2000 | Hara et al. | |
| 6,139,784 A | 10/2000 | Oshima et al. | |
| 6,303,054 B1 | 10/2001 | Kanetake et al. | |
| 8,092,718 B2 * | 1/2012 | Watanabe | 252/500 |
| 2003/0119968 A1 * | 6/2003 | Hara et al. | 524/495 |
| 2004/0179871 A1 * | 9/2004 | Fukuda | 399/302 |
| 2004/0234222 A1 * | 11/2004 | Kuroda et al. | 385/129 |
| 2005/0061423 A1 * | 3/2005 | Kohayashi | 156/233 |
| 2006/0251379 A1 * | 11/2006 | Kuroda et al. | 385/147 |
| 2009/0279925 A1 * | 11/2009 | Sugimoto et al. | 399/308 |

FOREIGN PATENT DOCUMENTS

| | | |
|---|---|---|
| EP | 1 721 924 | 11/2006 |
| JP | 5-65342 | 3/1993 |
| JP | 5-77252 | 3/1993 |
| JP | 5-112642 | 5/1993 |
| JP | 5-132554 | 5/1993 |
| JP | 7-156287 | 6/1995 |
| JP | 10-63115 | 3/1998 |
| JP | 10-83122 | 3/1998 |
| JP | 2000-281902 | 10/2000 |
| JP | 2003-266454 | 9/2003 |
| JP | 2006-206778 | 8/2006 |
| JP | 2008-163219 | 7/2008 |
| WO | WO 2008035625 A1 * | 3/2008 |

OTHER PUBLICATIONS

International Search Report issued Dec. 22, 2008 in International (PCT) Application No. PCT/JP2008/071580.
Supplementary European Search Report issued Nov. 23, 2012 in corresponding European Application No. 08854948.0.

* cited by examiner

*Primary Examiner* — Douglas McGinty
(74) *Attorney, Agent, or Firm* — Wenderoth, Lind & Ponack, L.L.P.

(57) ABSTRACT

A semiconductive polyimide resin belt that exhibits excellent electrical properties, including the ability to achieve accurate image transfer in a color image-forming unit, and the ability to prevent variations in resistance due to the transfer voltage, enabling high-quality transfer images to be stably produced over an extended period of time; and excellent physical properties, including resistance to deterioration in flatness due to plastic deformation caused by loads applied in the width direction of the belt, excellent durability, and stable operation even after extended use; and an intermediate transfer belt made of the semiconductive polyimide resin belt. The semiconductive polyimide resin belt comprises carbon black and a polyimide resin. The polyimide resin is obtained by imidization of terphenyl-3,3',4,4'-tetracarboxylic dianhydride and an aromatic diamine component containing 50 mol % or more of an aromatic diamine having 3 and/or 4 aromatic rings based on a total amount of the aromatic diamine component.

17 Claims, 1 Drawing Sheet

SEMIELECTROCONDUCTIVE POLYIMIDE RESIN BELT AND PROCESS FOR PRODUCING SEMIELECTROCONDUCTIVE POLYIMIDE RESIN BELT

TECHNICAL FIELD

The present invention relates to a semiconductive polyimide resin belt for use in electrophotographic devices having a color image-forming unit, such as electrophotographic multifunction devices, printers, facsimiles, and multifunction devices thereof, as well as digital printers; and a process for producing such a semiconductive polyimide resin belt. More particularly, the invention relates to a semiconductive polyimide resin belt that, when used as an intermediate transfer belt or the like in a color image-forming unit, exhibits excellent mechanical properties including resistance to cracking or breaking caused by loads applied in the width direction of the belt, excellent durability, and stable operation even after extended use; and a process for producing such a semiconductive polyimide resin belt.

BACKGROUND ART

In an image-forming unit to which an electrophotographic method is applied, the following intermediate transfer method is known. First, electrical charges are evenly formed on a latent image carrier made of an inorganic or organic photoconductor. An electrostatic latent image is formed using a laser, light-emitting diode light, or the like modulated by an image signal, and then the electrostatic latent image is developed by a charged toner to form a visualized toner image. Subsequently, the toner image is primarily transferred electrostatically to an intermediate transfer belt, after which the toner image on the intermediate transfer belt is secondarily transferred electrostatically to recording paper. The transferred toner image is fixed by application of heat or pressure, thereby reproducing a desired image.

As the recent demands for office automation equipment extend not only to higher speed and image quality, but also to improved durability for key components, it is now indispensable for intermediate transfer belts to have materials designed to stably produce high-quality transfer images over an extended period of time. The development of a technique for producing an intermediate transfer belt having both excellent electrical and physical properties is becoming increasingly important. Excellent electrical properties include, for example, the ability to achieve accurate image transfer in a color image-forming unit, and the ability to prevent variations in resistance due to the transfer voltage, enabling high-quality transfer images to be stably produced over an extended period of time. Excellent physical properties include, for example, little deterioration in flatness due to plastic deformation caused by loads applied in the width direction of the belt, excellent bending durability, and stable operation even after extended use.

A semiconductive belt obtained by adding a conductive filler to a polyimide resin film having excellent mechanical properties and heat resistance is known as a semiconductive belt usable as an intermediate transfer belt.

An example of such a known conductive belt is a conductive polyimide seamless belt obtained by adding conductive carbon black, such as acetylene black or Ketjenblack, to a polyimide resin having a high mechanical strength (see, for example, Patent Document 1).

Semiconductive polyimide resin belts are also known that are produced from a feedstock solution in which a conductive filler is dispersed in a high-molecular-weight polyamic acid solution obtained by reacting 3,3',4,4'-biphenyltetracarboxylic dianhydride and p-phenylenediamine (see, for example, Patent Documents 2 to 4).

However, although these semiconductive polyimide resin belts have sufficient rigidity because of the use of a rigid polyimide resin, the lack of flexibility has posed the problem of susceptibility to cracking from edge portions of the belt after extended use.

Also known are processes for producing a semiconductive polyimide resin belt from a feedstock solution obtained by dispersing carbon black with a pH of 2 to 4 in a high-molecular-weight polyamic acid solution obtained by reacting 3,3',4,4'-biphenyltetracarboxylic dianhydride with 4,4'-diaminodiphenyl ether having flexibility (see, for example, Patent Document 5); and processes for producing a belt made of a copolymer of 3,3',4,4'-biphenyltetracarboxylic dianhydride, p-phenylenediamine, and 4,4'-diaminodiphenyl ether (see, for example, Patent Document 6).

As in the processes of Patent Documents 5 and 6, the use of 4,4'-diaminodiphenyl ether having flexibility as a diamine compound reduces rigidity and thus imparts flexibility, thereby increasing the resistance to cracking from edge portions of the belt. However, the insufficient rigidity causes plastic deformation of the belt by loads applied in the width direction after extended use, resulting in a deterioration in flatness. This deterioration in flatness is known to cause problems such as white patches and color image positioning errors when the belt is used as an intermediate transfer belt in an image-forming unit.

Furthermore, processes for producing a belt made of a copolymer of tetracarboxylic dianhydrides, which are 3,3',4,4'-biphenyltetracarboxylic dianhydride and pyromellitic acid dianhydride; and aromatic diamines, which are p-phenylenediamine and diaminodiphenylsulfone, are known (see, for example, Patent Document 7).

Rotational molding has been previously considered as a process for producing a seamless belt of a semiconductive polyimide resin with high accuracy. According to Patent Documents 2 to 7, such belts are produced by a process wherein a polyimide resin precursor solution is applied to the inner surface of a cylindrical mold, and a film is formed by centrifugal molding. Next, the removal of a portion of the solvent and partial imidization of the precursor is carried out until the film becomes self-supporting. The film is then stripped from the mold, the mold is replaced with the outer periphery of a tubular mold, and then the removal of the solvent and the imidization reaction is completed. When a polyamic acid solution principally containing 3,3',4,4'-biphenyltetracarboxylic dianhydride is used, an attempt to complete the imidization after rotational molding with the film of the solution adhering to the cylindrical mold causes the film to be stripped from the inner surface of the mold due to the evaporation of the solvent, the volume shrinkage force created during the imidization reaction, and the shrinkage stress caused by a strong surface orientation during the imidization reaction. For this reason, the imidization step involves stripping the film from the cylindrical mold, and replacing the cylindrical mold with the outer periphery of a tubular mold.

However, the imidization using a tubular mold as mentioned above results in an inability to remove the residue on evaporation of the solvent remaining on the stripped belt. This has posed problems such as the expansion of the belt due to the solvent gathered between the belt and tubular mold, and a deterioration in the flatness of the belt due to the shrinkage that occurs during the imidization reaction, causing the belt to ripple.

Patent Document 1: Japanese Unexamined Patent Publication No. 5-077252
Patent Document 2: Japanese Unexamined Patent Publication No. 7-156287
Patent Document 3: Japanese Unexamined Patent Publication No. 10-63115
Patent Document 4: Japanese Unexamined Patent Publication No. 10-83122
Patent Document 5: Japanese Unexamined Patent Publication No. 2000-281902
Patent Document 6: Japanese Unexamined Patent Publication No. 2003-266454
Patent Document 7: Japanese Unexamined Patent Publication No. 2006-206778

DISCLOSURE OF THE INVENTION

Problems to be Solved by the Invention

An object of the present invention is to provide a semiconductive polyimide resin belt that exhibits excellent electrical properties, including the ability to achieve accurate image transfer in a color image-forming unit, and the ability to stably produce high-quality transfer images over an extended period of time; and excellent physical properties, including resistance to deterioration in flatness due to plastic deformation caused by loads applied in the width direction of the belt, excellent durability, and stable operation even after extended use. More particularly, the invention provides an intermediate transfer belt made of the semiconductive polyimide resin belt.

Means for Solving the Problems

The present inventors conducted extensive research to solve the above-described object, and consequently found that the above-mentioned object can be achieved by providing a semiconductive polyimide resin belt obtained by loading carbon black into a polyimide resin that is obtained by imidization of terphenyl-3,3',4,4'-tetracarboxylic dianhydride and an aromatic diamine component, wherein the aromatic diamine component contains 50 mol % or more of an aromatic diamine having 3 and/or 4 aromatic rings based on the total amount of the aromatic diamine component. The invention was completed upon further studies based on this finding.

Specifically, the invention provides a semiconductive polyimide resin belt and a process for producing the semiconductive polyimide resin belt, as summarized below.

Item 1. A semiconductive polyimide resin belt comprising carbon black and a polyimide resin, the polyimide resin being obtained by imidization of terphenyl-3,3',4,4'-tetracarboxylic dianhydride and an aromatic diamine component, the aromatic diamine component containing 50 mol % or more of an aromatic diamine having 3 and/or 4 aromatic rings based on a total amount of the aromatic diamine component.

Item 2. The semiconductive polyimide resin belt according to Item 1, wherein the aromatic diamine component contains 50 to 90 mol % of 4,4'-diamino-p-terphenyl based on the total amount of the aromatic diamine component.

Item 3. The semiconductive polyimide resin belt according to Item 1 or 2, wherein the aromatic diamine component includes at least one aromatic diamine selected from the group consisting of 4,4'-diaminodiphenyl ether, 4,4'-diamino-p-terphenyl, 4,4'-bis(4-aminophenoxy)biphenyl, and bis[4-(4-aminophenoxy)phenyl]ether.

Item 4. The semiconductive polyimide resin belt according to any one of Items 1 to 3, wherein a tensile strength at yield: σy, as recorded by a stress-strain curve measured according to JIS K7113, is 180 MPa or more, and wherein the tensile strength at yield: σy and a tensile strength at break: σb satisfy the following relation:

(tensile strength at break: σb)/(tensile strength at yield: σy)≧1.1.

Item 5. An intermediate transfer belt for an electrophotographic device comprising the semiconductive polyimide resin belt of any one of Items 1 to 4, wherein the semiconductive polyimide resin belt has a surface resistivity of $1\times10^8$ to $1\times10^{14}$ Ω/sq.

Item 6. A process for producing a semiconductive polyimide resin belt by preparing a polyamic acid solution by reacting terphenyl-3,3',4,4'-tetracarboxylic dianhydride with an aromatic diamine component in an organic polar solvent; dispersing carbon black in the polyamic acid solution to prepare a carbon black-dispersed polyamic acid solution composition; molding the carbon black-dispersed polyamic acid solution composition into a tubular shape by rotational molding; and imidizing the molded product by heat treatment, the process comprising the steps of:

(1) applying the carbon black-dispersed polyamic acid solution composition to an inner surface of a rotating cylindrical mold;

(2) forming a self-supporting film by applying heat of 80 to 150° C. to the rotating cylindrical mold; and (3) imidizing the film at a temperature of 300 to 350° C., with the film adhering to the inner surface of the cylindrical mold.

The invention will be described in detail below.

1. Semiconductive Polyimide Resin Belt

The present invention relates to a semiconductive polyimide resin belt comprising carbon black and a polyimide resin, wherein the polyimide resin is obtained by imidization of terphenyl-3,3',4,4'-tetracarboxylic dianhydride and an aromatic diamine component, and the aromatic diamine component contains 50 mol % or more of an aromatic diamine having 3 and/or 4 aromatic rings based on a total amount of the aromatic diamine component.

1.1 Polyimide Resin

The polyimide resin used in the invention may be any polyimide resin obtained by imidizing terphenyl-3,3',4,4'-tetracarboxylic dianhydride with an aromatic diamine component containing 50 mol % or more of an aromatic diamine having 3 and/or 4 aromatic rings based on the total amount of the aromatic diamine component.

Terphenyl-3,3',4,4'-tetracarboxylic dianhydride contains 3 aromatic rings, and has the following structure:

The carboxylic dianhydride component used in the invention may include, in addition to terphenyl-3,3',4,4'-tetracarboxylic dianhydride, other carboxylic dianhydrides in amounts such that the effects of the invention are not impaired.

Examples of carboxylic dianhydrides other than terphenyl-3,3',4,4'-tetracarboxylic dianhydride include known acid anhydrides such as pyromellitic acid dianhydride; 3,3',4,4'-diphenyl tetracarboxylic dianhydride; 3,3',4,4'-benzophenone tetracarboxylic dianhydride; 1,2,5,6-naphthalene tetracarboxylic dianhydride; 2,3,6,7-naphthalene tetracarboxylic dianhydride; 1,4,5,8-naphthalene tetracarboxylic dianhydride; 4,4'-sulfonyl diphthalic acid dianhydride; and 4,4'-oxydiphthalic acid dianhydride.

The aromatic diamine component used in the invention may be any aromatic diamine component, as long as it contains 50 mol % or more of an aromatic diamine having 3 and/or 4 aromatic rings based on the total amount of the aromatic diamine.

In the invention, the amount of an aromatic diamine having 3 and/or 4 aromatic rings is 50 mol % or more, but is preferably 60 mol % or more, and more preferably 70 mol % or more, based on the total amount of the aromatic diamine. The upper limit of the amount of the aromatic diamine having 3 and/or 4 aromatic rings is not limited, but is, for example, preferably 100 mol %. The use of the aromatic diamine having 3 and/or 4 aromatic rings within the above-mentioned ranges is preferred, because the resulting semiconductive polyimide resin belt has well-balanced rigidity and toughness, excellent durability, and undergoes little deterioration in flatness even after extended use.

Examples of aromatic diamines having 3 aromatic rings include:

Examples of aromatic diamines having 4 aromatic rings include:

These aromatic diamines having 3 aromatic rings and aromatic diamines having 4 aromatic rings can be used alone or in combination.

Preferred among these is an aromatic diamine containing 4,4'-diamino-p-terphenyl. In this case, the amount of 4,4'-diamino-p-terphenyl is preferably 50 to 90 mol %, more preferably 60 to 80 mol %, and still more preferably 70 to 80 mol %, based on the total amount of the aromatic diamine. The use of 4,4'-diamino-p-terphenyl within the above-mentioned ranges is preferred, because the resulting semiconductive polyimide resin belt has well-balanced rigidity and toughness, excellent durability, and undergoes little deterioration in flatness even after extended use.

The aromatic diamine component used in the invention preferably includes both of an aromatic diamine having 3 aromatic rings and an aromatic diamine having 4 aromatic rings. The molar ratio of the aromatic diamine having 3 aromatic rings to the aromatic diamine having 4 aromatic rings is preferably 30:70 to 80:20, and more preferably 50:50 to 70:30. These ranges are preferred because the resulting semiconductive polyimide resin belt has well-balanced rigidity and toughness, excellent durability, and undergoes little deterioration in flatness even after extended use.

Preferable combinations of an aromatic diamine having 3 aromatic rings and an aromatic diamine having 4 aromatic rings are the combination of 4,4'-diamino-p-terphenyl and 4,4'-bis(4-aminophenoxy)biphenyl; and the combination of 4,4'-diamino-p-terphenyl and bis[4-(4-aminophenoxy)phenyl]ether.

Examples of aromatic diamine components usable in the invention other than the above-mentioned aromatic diamines having 3 and/or 4 aromatic rings include p-phenylenediamine, m-phenylenediamine, 4,4'-diaminodiphenyl ether, 4,4'-diaminodiphenyl methane, 4,4'-diaminodiphenyl sulfone, 4,4'-diamino diphenyl sulfide, benzidine, 1,5-naphthalenediamine, and 2,6-naphthalenediamine. Preferred among these is 4,4'-diaminodiphenyl ether.

The polyimide resin used in the invention contains a structural unit derived from terphenyl-3,3',4,4'-tetracarboxylic dianhydride represented by Formula (1):

Moreover, the polyimide resin used in the invention preferably contains at least one of the structural units represented by Formulae (2) to (6):

The structural units represented by Formulae (2) to (6) are derived from 4,4'-diamino-p-terphenyl, 1,4-bis(4-aminophenoxy)benzene, 4,4'-bis(4-aminophenoxy)biphenyl, bis[4-(4-aminophenoxy)phenyl]ether, and bis[4-(4-aminophenoxy)phenyl]sulfone, respectively.

The polyimide resin used in the invention is preferably a polyimide resin containing at least one repeating unit selected from the following repeating units consisting of the structural unit (1) derived from an acid dianhydride, and one or more structural units selected from the structural units (2) to (6) derived from diamine components:

diethylformamide, N,N-dimethylacetamide, dimethyl sulfoxide, hexamethylphosphoramide, and 1,3-dimethyl-2-imidazolidinone. These solvents may be used alone, or as a mixture of two or more solvents. Particularly preferred among the above is NMP, because it has a high boiling point, i.e., 200° C. or more, and is unlikely to evaporate from the film during the imidization by heating, thus facilitating the imidization due to the plasticization effect provided by the residual solvent.

The synthesis method of the polyimide resin is not limited, and may be a generally used method. Preferably, the polyimide resin is produced by a method wherein substantially equimolar amounts of the above-mentioned carboxylic dianhydride component and aromatic diamine components are reacted in an organic polar solvent to produce a polyimide precursor solution, and the precursor solution is subsequently imidized by heat treatment.

The organic polar solvent is not limited, but is preferably an aprotic organic polar solvent. Examples of aprotic organic polar solvents include N-methyl-2-pyrrolidone (hereinafter also referred to as "NMP"), N,N-dimethylformamide, N,N-

The viscosity of the polyimide precursor solution at 25° C. is not limited, but may preferably be 3.0 to 50 Pa·s, and more preferably 5.0 to 20 Pa·s.

As mentioned above, when a polyimide resin is used that is obtained by imidizing terphenyl-3,3',4,4'-tetracarboxylic dianhydride with an aromatic diamine component containing 50 mol % or more of an aromatic diamine having 3 and/or 4 aromatic rings based on the total amount of the aromatic diamine component, the resulting semiconductive polyimide resin belt has well-balanced rigidity and toughness, excellent durability, and undergoes little deterioration in flatness even after extended use.

In the present invention, carbon black is mixed into the polyimide precursor solution to produce a carbon black-dispersed polyimide precursor solution composition (hereinafter abbreviated as the "precursor solution composition"). The mixing method is not limited, as long as the carbon black is uniformly mixed and dispersed in the polyimide precursor solution. Examples of such methods include methods using a sand mill, a bead mill, an ultrasonic mill, a three-roll mill, and the like.

The carbon black content in the precursor solution composition is preferably 15 to 30 weight %, and more preferably 18 to 26 weight %, based on the total solids in the precursor solution composition.

As used herein, the "carbon black content in the precursor solution composition" corresponds to the carbon black content in a semiconductive polyimide resin belt produced from the solution.

Therefore, the polyimide resin content in the semiconductive polyimide resin belt of the invention is preferably 70 to 85 weight %, and more preferably 74 to 82 weight %.

The composition may contain additives such as imidazole compounds (2-methylimidazole, 1,2-dimethylimidazole, 2-methyl-4-methylimidazole, 2-ethyl-4-ethylimidazole, and 2-phenylimidazole); and surfactants (including fluorosurfactants), as long as the effects of the invention are not impaired.

According to the method described above, a precursor solution composition in which carbon black is uniformly dispersed can be produced.

The average particle size of the carbon black dispersed in the solution is preferably 0.1 to 0.5 μm, and more preferably 0.1 to 0.3 μm. The maximum particle size of the carbon black dispersed in the solution is preferably 1 μm or less, and more preferably 0.6 μm or less. Although the lower limit of the maximum particle size is not limited, it is preferably 0.2 μm or more.

1.2. Carbon Black

Examples of the carbon black used in the invention include, but are not limited to, carbon black whose electrical conductivity has been controlled by grafting a polymer to the surface of carbon black particles, or by coating the surface of carbon black particles with an insulating material; and carbon black obtained by subjecting the surface of carbon black particles to oxidation treatment. Among the above, carbon black obtained by an oil furnace process is preferable, because crystallites develop in this carbon black, which is produced by pyrolysis of hydrocarbons in a reducing atmosphere under a high-temperature gas at 1,400° C. or more created by fuel combustion, thus resulting in significantly reduced amounts of oxygen and impurities inside and on the surface of the particles of the carbon black. Preferably, the carbon black produced by an oil furnace process is subjected to oxidation treatment, because the volatile matter content of the carbon black can be adjusted by the oxidation treatment.

The following describes carbon black obtained by subjecting carbon black produced by an oil furnace process to oxidation treatment.

Examples of oxidizing agents used in the oxidation treatment include nitrogen oxides containing nitric acid, ozone, hypochlorous acid, and sulfuric acid gas. Among the above, oxidizing agents containing ozone, and particularly ozone, are preferred because they leave little residue in the carbon black after the oxidation treatment, and decompose undecomposed feedstock hydrocarbons (PAH). The amount of undecomposed feedstock hydrocarbons (PAH) should be kept as low as possible, and may specifically be 10 ppm or less.

As mentioned above, the volatile matter content of carbon black can be adjusted by subjecting carbon black produced by an oil furnace process to oxidation treatment. The carbon black preferably has a volatile matter content of 2 to 5 weight %, and more preferably 2.5 to 5 weight %.

The surface of the carbon black adjusted to a volatile matter content of 2 to 5 weight % by the oxidation treatment has oxygen functional groups, such as a phenolic hydroxyl group, a carbonyl group, and a carboxyl group, with a carboxyl group being particularly preferable. This improves the fluidity and dispersion stability of the carbon black in the polyimide precursor solution composition, and improves the affinity for the polyimide resin.

In the carbon black produced by an oil furnace process, there is an almost proportional relationship between the volatile matter content and the powder resistance, provided that the specific surface area and the dibutyl phthalate adsorption (DBP absorption) remain constant. Since the oxygen functional groups corresponding to the volatile matter content on the surface of the carbon black act as an insulator inhibiting the flow of $\pi$ electrons, carbon black produced by an oil furnace process and subjected to oxidation treatment has a greater powder resistance than carbon black produced by an oil furnace process but not subjected to oxidation treatment. Thus, by setting the volatile matter content within the above-mentioned range, the powder resistance of the carbon black can be controlled to a value as high as about 3 to about 30 Ω·cm.

This makes it possible to increase the carbon black load of the polyimide resin (the carbon black content is 15 to 30 weight % in the semiconductive polyimide resin belt, i.e., based on the total weight of the polyimide resin and carbon black) when setting the surface resistivity of the semiconductive polyimide resin belt within a desired range ($10^8$ to $10^{14}$ Ω/sq.). In this manner, a semiconductive polyimide resin belt can be obtained which is provided with electrical conductivity due to the formation of carbon black chains, and having stable electrical properties that will not be easily affected by the external environment or applied voltage. In other words, the carbon black content in the semiconductive polyimide resin belt of the invention can be controlled to a value as high as 15 to 30 weight %.

The volatile matter content of the carbon black is measured according to the method described in the Examples below.

Carbon black with a volatile matter content of less than 2% (for example, Mitsubishi Carbon Black MA-11 and MA-100, available from Mitsubishi Chemical Corporation; Printex 95 and Printex L6, available from Degussa) does not have a sufficient affinity for the polyimide precursor solution, and thus tends to form a secondary aggregate by the Van der Waals force after being dispersed.

Most types of carbon black having a volatile matter content exceeding 5% are produced by a channel process (for example, Color Black FW 200, Special Black 5, Special Black 4, and Printex 150T; Degussa), and contain large amounts of impurities such as sulfur and undecomposed feedstock hydrocarbons (PAH), in addition to hydrogen and oxygen. These impurities tend to degrade the inherent mechanical properties of the binder resin, such as the polyimide resin.

When carbon black produced by the oil furnace process is subjected to oxidation treatment such that the volatile matter content exceeds 5%, the powder resistance will substantially increase (because the resulting product is insulating carbon black); therefore, the surface resistivity of $10^8$ to $10^{14}$ Ω/sq. that is required for the intermediate transfer belt often cannot be achieved.

The carbon black used in the invention preferably has a nitrogen adsorption specific surface area (JIS K6217) of 80 to 150 m$^2$/g, and more preferably 90 to 130 m$^2$/g.

Generally, the oxidation of carbon black by various methods will increase the number of oxygen functional groups as the specific surface area increases. However, the powder resistance of the carbon black, as well as the physical properties of various materials containing the carbon black, is correlated with the number of oxygen functional groups present on a unit surface of the carbon black, rather than with the absolute number of the oxygen functional groups.

A nitrogen adsorption specific surface area of less than 80 m$^2$/g cannot provide the carbon black with affinity for the polyimide precursor solution, often resulting in insufficient powder resistance. On the other hand, a nitrogen adsorption specific surface area exceeding 150 m$^2$/g will result in carbon black having a large specific surface area, i.e., carbon black having a small primary particle size, or carbon black having pores even with the same particle size. Providing oxygen functional groups to such carbon black will not increase the powder resistance of the carbon black. Therefore, a semiconductive polyimide resin belt having a high carbon black content (for example, a high carbon black load of 15 weight % or more) often cannot be obtained. That is, the resulting semiconductive polyimide resin belt often has only a low carbon black load.

The carbon black used in the invention has a pH of 2 to 5, preferably 2 to 4, and more preferably 2 to 3.

Furthermore, the carbon black used in the invention preferably has a dibutyl phthalate absorption (DBP absorption) of 40 to 100 ml/100 g, and more preferably 50 to 90 ml/100 g. If the DBP absorption exceeds 100 ml/100 g, the powder resistance of the carbon black cannot be increased by oxidation treatment, often making it impossible to obtain a semiconductive polyimide resin belt loaded with carbon black in a high concentration, i.e., 15 weight % or more. If the DBP absorption is less than 40 ml/100 g, the powder resistance will become too high; therefore, a semiconductive polyimide resin belt cannot be obtained unless carbon black is loaded to a concentration exceeding 30 weight % in the solids content.

The surface resistivity of the semiconductive copolymerized polyimide belt of the present invention is preferably $1\times10^8$ to $1\times10^{14}$ Ω/sq., more preferably $1\times10^9$ to $1\times10^{14}$ Ω/sq., and still more preferably $1\times10^{10}$ to $1\times10^{13}$ Ω/sq. By arranging the surface resistivity within this range, both the prevention of diffusion of toner during the transference of images and the self-charge elimination of the intermediate transfer belt can be achieved without storing charge on the intermediate transfer belt.

In designing materials for the semiconductive polyimide resin belt of the invention, in particular the intermediate transfer belt for an electrophotographic apparatus formed of the semiconductive polyimide resin belt, the tensile strength at yield: σy and the tensile strength at break: σb are important strength factors. The tensile strength at yield: σy is preferably at least 180 MPa, and more preferably 195 MPa. Having the tensile strength at yield: σy within this range prevents the occurrence of plastic deformation due to the load applied in the width direction of the belt, even when the belt is made thin with a thickness of not greater than 80 μm. The occurrence of plastic deformation (dimensional change caused by elongation) deteriorates the flatness of the belt, resulting in non-uniform images.

It is also necessary for the tensile strength at break: σb to be greater than the tensile strength at yield: σy in order to increase the life span of the belt (toughness against rotation). Accordingly, it is preferable that the ratio σb/σy be greater than or equal to 1.1, and more preferably greater than or equal to 1.15. When the ratio σb/σy is less than 1.1, the belt tends to break before plastic deformation occurs.

Here, the tensile strength at break: σb and the tensile strength at yield: σy correspond to the tensile strength at break and the tensile strength at yield recorded as the stress-strain curve measured according to JIS K7113.

It is preferable that the flatness of the semiconductive polyimide resin belt of the invention in the width direction be not greater than 2 mm, and more preferably not greater than 1.5 mm. When the flatness falls within this range, the drive roll for driving the belt and the intermediate transfer belt are closely attached, allowing highly accurate color image positioning. The flatness is shown by the values measured by the process explained in the Examples.

The process for producing the semiconductive polyimide resin belt of the invention is not particularly limited. A preferable example thereof is described below.

2. Process for Producing Semiconductive Polyimide Resin Belt

The present invention relates to a process for producing a semiconductive polyimide resin belt. In this process, the semiconductive polyimide resin belt is produced by obtaining a polyimide precursor solution (this may be referred to as a polyamic acid solution) by reacting terphenyl-3,3',4,4'-tetracarboxylic dianhydride with aromatic diamine in an organic polar solvent, dispersing carbon black in the solution, obtaining a carbon black-dispersed polyimide precursor solution composition (this may be referred to as a carbon black-dispersed polyamic acid solution composition), molding the carbon black-dispersed polyimide precursor solution composition into a tubular shape by rotational molding, and then imidizing the molded product.

The process comprises the steps of:

(1) applying the carbon black-dispersed polyimide precursor solution composition to the inner surface of a rotating cylindrical mold, (2) forming a self-supporting film by applying heat of 80° C. to 150° C. to the rotating cylindrical mold, and (3) imidizing the film at a temperature of 300° C. to 350° C., with the film adhering to the inner surface of the cylindrical mold.

The following describes a process for producing a semiconductive polyimide resin belt using the carbon black-dispersed polyimide precursor solution composition (hereinafter referred to simply as a "precursor solution composition").

Any precursor solution compositions disclosed in the present specification may be preferably used as the precursor solution composition.

The precursor solution composition is applied to the inner surface of the rotating cylindrical mold in such a manner as to have a uniform thickness. The rotation speed of the cylindrical mold is not limited, and is preferably at a low centrifugal acceleration 0.5 to 10 times the gravitational acceleration. Application of the precursor solution composition at a low centrifugal acceleration 0.5 to 10 times the gravitational acceleration, makes it possible to reduce the shear force exerted to the precursor solution composition in the rotational direction, and suppress the orientation of the molecular chains and the structural orientation of fillers such as carbon black.

When the centrifugal acceleration is less than 0.5 times the gravitational acceleration, there is a risk that the supplied precursor solution composition may fall (drip) off, instead of adhering to the inner surface of the cylindrical mold. When the centrifugal acceleration is greater than 10 times the gravitational acceleration, it would otherwise cause the precursor solution composition to flow under the centrifugal force, in addition to exerting a shear force in the rotational direction, and causes the orientation of the molecular chains and the structural orientation of fillers such as carbon black. This may adversely affect the surface flatness of the resulting belt.

The centrifugal acceleration (G) employed in the present invention is given by the following formula.

$$G(m/s^2) = r \cdot \omega^2 = r \cdot (2 \cdot \pi \cdot n)^2$$

where r represents the radius (m) of the cylindrical mold, ω represents the angular velocity (rad/s), and n represents the number of rotations per second (rpm for the number of rotations per 60 seconds). The reference gravitational acceleration (g) is 9.8 (m/s$^2$).

The precursor solution composition supply means discharges the precursor solution composition by a nozzle or spray method while moving along the rotational axis of the rotating cylindrical mold to apply the precursor solution composition in uniform thickness onto the inner surface of the cylindrical mold. Here, the term "uniform thickness" means applying the precursor solution composition onto the inner surface of the cylindrical mold with a thickness that is in a range of ±5% relative to the average coating thickness.

Spray coating is preferable as the means for applying the precursor solution composition for the reasons described below. By atomizing, the precursor solution composition can be adhered instantaneously on the inner surface of the rotating cylindrical mold while minimizing the flowing thereof. The precursor solution composition can be supplied under a fixed rotating speed with little affect by the viscosity thereof. A very thin film can be readily obtained, and having a high nonvolatile matter content of the precursor solution composition becomes feasible.

The shape of the coating head is not particularly limited, and may be suitably selected from circular, rectangular, etc. Further, the coating head is not limited to a particular size, and may be suitably designed depending on the viscosity of the precursor solution composition to be discharged so that a desirable discharge pressure is obtained.

The distance between the spray head and the cylindrical mold may be suitably selected, and is preferably about 5 to 200 mm. The method of applying discharge pressure is not particularly limited, and the pressure may be applied by using, for example, a mohno pump or a gear pump that accommodates compressed air or high-viscosity liquid.

Because the precursor solution composition is applied in uniform thickness onto the inner surface of the cylindrical mold, it is not necessary to form a film of a uniform thickness by the high-speed rotation of the cylindrical mold, or more specifically, by causing the precursor solution composition to flow by using centrifugal force. In rotational molding that uses centrifugal force, the supplied precursor solution composition is uniformly flowed onto the inner surface of the cylindrical mold by centrifugal force. The flow made by the centrifugal force causes the carbon black particles to align and form a structure along the direction of flow. Often, this has adverse effects on the electrical properties of a polyimide intermediate transfer belt. The method of the present invention, which does not employ high-speed rotation, is nearly free from such a problem.

It is preferable that the inner surface of the cylindrical mold be coated with a mold release agent to prevent the adhesion of the polyimide resin. The type of mold release agent is not particularly limited, as long as it is not affected by the solvent of the precursor solution composition, or by water vapor generated from resin during a heat reaction.

In the liquid resin film-forming step, the solvent is evaporated at a temperature of 80° C. to 150° C. (preferably, 100° C. to 140° C.) to make the solids content 40 weight % or more, with the cylindrical mold being rotated at a low centrifugal acceleration, i.e., 0.5 to 10 times the gravitational acceleration. This forms a self-supporting film on the inner surface of the cylindrical mold.

In the polyimide resin film-forming step, the film is heated to about 250° C. for 60 to 120 minutes, with the film adhering to the inner surface of the cylindrical mold. The temperature and time vary depending on the type of polyimide resin. The film is further heated to a temperature that completely converts the resin to polyimide, for example, at 300° C. to 350° C. for 30 to 90 minutes, so that a polyimide resin film is formed. Because the film is formed while it adheres to the inner surface of the cylindrical mold, the shrinkage caused by the imidization reaction or solvent evaporation can be suppressed, and the exerted stress can act to uniformly orient the polymer chains along the in-plane direction.

As described above, the precursor solution composition used in the present invention has a high solids content and a high carbon black content. A semiconductive polyimide resin belt molded from the precursor solution composition accordingly has a high carbon black content, as well as toughness and other mechanical properties that are characteristic of polyimide resin.

The average thickness of the semiconductive polyimide belt is adjusted in a range of generally about 50 to 150 μm, preferably about 60 to 125 μm.

When the semiconductive polyimide belt of the present invention that is produced as described above is used, for example, as an intermediate transfer belt for a color image-forming unit in an electrophotographic apparatus, excellent mechanical properties can be attained. Specifically, the resulting belt barely suffers from cracks or breakage caused by loads applied to the belt in the width direction, has excellent durability, and achieves stable operation even after extended use.

The semiconductive polyimide resin belt of the invention is usable as an intermediate transfer belt of an electrophotographic apparatus, and as a substrate for a transfer- and fusing belt; i.e., a single belt functions both as a transfer belt and fixing belt. When used as a transfer- and fusing belt, in order to improve the removability of the toner adhered on the surface, forming a non-adhesive resin film on the surface is recommendable. Preferable examples of the materials for the non-adhesive resin film include polytetrafluoroethylene (PTFE), tetrafluoroethylene-perfluoroalkyl(vinyl ether) copolymers (PFA), tetrafluoroethylene-hexafluoropropylene (FEP) copolymers, and like fluorine-contained polymer resins. Elastic silicone resin, fluororubber resin, elastic fluorosilicone resin, elastic polysiloxane and the like may also be used.

Effect of the Invention

The present invention provides a semiconductive polyimide resin belt having excellent electrical properties, such as transferring accurate images in a color image-forming unit, and forming a stable, high-quality transfer image over extended periods of time, while also having excellent physical properties, such as excellent resistance to the deterioration of flatness due to changes in plasticity caused by loads applied to the belt in the width direction, excellent durability, and stable operation even after extended use. The semiconductive polyimide resin belt of the invention is usable as an intermediate transfer belt, and as a transfer- and fusing belt that functions as both a transfer belt and a fixing belt.

BEST MODE FOR CARRYING OUT THE INVENTION

The following describes the present invention in more detail based on Examples and Comparative Examples. It should be noted, however, that the invention is in no way limited by the descriptions of the following examples.

Example 1

Preparation of a Carbon Black-Dispersed Polyimide Precursor Solution Composition 5 kg of a polyamic acid solution of polyimide precursor was prepared by polymerizing substantially equimolar amounts of carboxylic dianhydride components and aromatic diamine components in N-methyl-2-pyrrolidone, specifically 100 mol % p-terphenyl-3,3',4,4'-tetracarboxylic acid dianhydride (TPDA) per total carboxylic dianhydride components, 70 mol % 4,4'-diamino-p-terphenyl and 30 mol % 4,4'-diaminodiphenyl ether (DADE) per total aromatic diamine components. The resulting polyamic acid solution had a viscosity of 9.0 Pa·s (25° C.) and a nonvolatile matter content of 18 weight %.

0.25 kg of oil-furnace carbon black (CB1, pH: 4.1, nitrogen adsorption specific surface area: 95 $m^2/g$, DBP absorption: 65 ml/100 g, volatile matter content: 2.1 weight %) and 1.8 kg of N-methyl-2-pyrrolidone were added to the thus-obtained solution, and the carbon black was uniformly dispersed therein using a ball mill, obtaining a carbon black-dispersed polyimide precursor solution composition A (hereunder, referred to as precursor solution composition A). Precursor solution composition A had a solids content of 16.3, wherein the content of carbon black was 21.7 weight %. The average particle diameter of the carbon black in the solution was 0.28 μm, and the maximum particle diameter was 0.51 μm.

(Production of a Carbon Black-Loaded Polyimide Seamless Belt)

Precursor solution composition A was applied to the inner surface of a cylindrical mold having an outer diameter of 324 mm, an inner diameter of 300 mm, and a length of 500 mm by spray coating, while rotating the cylindrical mold at a centrifugal acceleration 4.0 times the gravitational acceleration (about 154 rpm). A molded film having a length of 480 mm was uniformly formed onto the 500-mm length of the inner surface of the cylindrical mold. The film thickness was calculated from the nonvolatile matter content and determined so as to make the thickness of the polyimide resin belt 75 μm. The film was heated to 120° C. over a period of 30 minutes while rotating the cylindrical mold at a centrifugal acceleration 4.0 times the gravitational acceleration (about 154 rpm), and kept at 120° C. for 100 minutes to evaporate the solvent.

The tubular substance adhering to the inner surface of the cylindrical mold was then placed into a high-temperature furnace, where it was heated to 320° C. (heating rate: about 1.33° C./min) over a period of 150 minutes, and maintained at 320° C. for 60 minutes to complete the polyimidization. After cooling to room temperature, the tubular substance was removed from the mold to obtain a carbon black-loaded polyimide seamless belt having a thickness of 75 μm.

Example 2

Preparation of a Carbon Black-Dispersed Polyimide Precursor Solution 5 kg of a polyamic acid solution of polyimide precursor was prepared by polymerizing substantially equimolar amounts of carboxylic dianhydride components and aromatic diamine components in N-methyl-2-pyrrolidone, specifically 100 mol % p-terphenyl-3,3',4,4'-tetracarboxylic acid dianhydride (p-TPDA) per total carboxylic dianhydride components, 50 mol % 4,4'-diamino-p-terphenyl and 50 mol % 4,4'-bis(4-aminophenoxy)biphenyl per total aromatic diamine components. The resulting polyamic acid solution had a viscosity of 8.5 Pa·s (25° C.) and a nonvolatile matter content of 19 weight %

0.21 kg of oil-furnace carbon black (CB2, pH: 2.5, nitrogen adsorption specific surface area: 120 $m^2/g$, DBP absorption: 105 ml/100 g, volatile matter content: 3.9 weight %) and 1.8 kg of N-methyl-2-pyrrolidone were added to the thus-obtained solution, and the carbon black was uniformly dispersed therein using a ball mill, obtaining a carbon black-dispersed polyimide precursor solution composition B (hereunder referred to as precursor solution composition B). The solution had a solids content of 16.5 weight %, wherein the carbon black content was 18.1 weight %. The average particle diameter of the carbon black in the solution was 0.26 μm, and the maximum particle diameter was 0.44 μm.

(Production of a Carbon Black-Loaded Polyimide Seamless Belt)

A carbon black-loaded polyimide seamless belt (average thickness: 75 μm) was produced in the same manner as in Example 1, except that precursor solution composition B was used.

Example 3

Preparation of a Carbon Black-Dispersed Polyimide Precursor Solution 5 kg of a polyamic acid solution of polyimide precursor was prepared by polymerizing substantially equimolar amounts of carboxylic dianhydride components and aromatic diamine components in N-methyl-2-pyrrolidone, specifically 100 mol % p-terphenyl-3,3',4,4'-tetracarboxylic acid dianhydride (p-TPDA) per total carboxylic dianhydride components, 60 mol % 4,4'-diamino-p-terphenyl and 40 mol % bis[4-(4-aminophenoxy)phenyl]ether per total aromatic diamine components. The resulting polyamic acid solution had a viscosity of 7.0 Pa·s (25° C.) and a nonvolatile matter content of 18 weight %.

0.28 kg of oil-furnace carbon black (CB3, pH: 2.3, nitrogen adsorption specific surface area: 120 $m^2/g$, DBP absorption: 75 ml/100 g, volatile matter content: 3.3 weight %) and 1.8 kg of N-methyl-2-pyrrolidone were added to the thus-obtained solution, and the carbon black was uniformly dispersed therein using a ball mill, obtaining a carbon black-dispersed polyimide precursor solution composition C (hereunder, referred to as precursor solution composition C). Precursor solution composition C had a solids content of 16.7, wherein the content of carbon black was 23.7 weight %. The average particle diameter of the carbon black in the solution was 0.25 μm, and the maximum particle diameter was 0.44 μm.

(Production of a Carbon Black-Loaded Polyimide Seamless Belt)

A carbon black-loaded polyimide seamless belt (average thickness: 75 μm) was produced in the same manner as in Example 1, except that precursor solution composition C was used.

Comparative Example 1

Preparation of a Carbon Black-Dispersed Polyimide Precursor Solution 5 kg of a polyamic acid solution of polyimide precursor was prepared by polymerizing substantially equimolar amounts of carboxylic dianhydride components and aromatic diamine components in N-methyl-2-pyrrolidone, specifically 100 mol % p-terphenyl-3,3',4,4'-tetracarboxylic acid dianhydride (p-TPDA) per total carboxylic dianhydride components, and 100 mol % p-phenylenediamine (PPD) per total aromatic diamine components. The resulting polyamic acid solution had a viscosity of 8.0 Pa·s (25° C.) and a nonvolatile matter content of 20 weight %

0.30 kg of oil-furnace carbon black (CB1, pH: 4.1, nitrogen adsorption specific surface area: 95 m$^2$/g, DBP absorption: 65 ml/100 g, volatile matter content: 2.1 weight %), which is the same as that used in Example 1, and 1.8 kg of N-methyl-2-pyrrolidone were added to the thus-obtained solution, and the carbon black was uniformly dispersed therein using a ball mill, obtaining a carbon black-dispersed polyimide precursor solution composition D (hereunder refereed to as precursor solution composition D). Precursor solution composition D had a solids content of 18.3 weight %, wherein the content of carbon black was 23.0 weight % per total weight of solids components. The average particle diameter of the carbon black in the solution was 0.28 μm, and the maximum particle diameter was 0.51 μm.

(Production of a Carbon Black-Loaded Polyimide Seamless Belt)

A carbon black-loaded polyimide seamless belt (average thickness: 75 μm) was produced in the same manner as in Example 1, except that precursor solution composition D was used.

Comparative Example 2

Preparation of a Carbon Black-Dispersed Polyimide Precursor Solution 5 kg of a polyamic acid solution of polyimide precursor was prepared by polymerizing substantially equimolar amounts of carboxylic dianhydride components and aromatic diamine components in N-methyl-2-pyrrolidone, specifically 100 mol % p-terphenyl-3,3',4,4'-tetracarboxylic acid dianhydride (p-TPDA) per total carboxylic dianhydride components and 100 mol % 4,4'-diaminodiphenyl ether (DADE) per total aromatic diamine components. The resulting carbon black-dispersed polyimide precursor solution had a viscosity of 7.5 Pa·s (25° C.) and a nonvolatile matter content of 20.0 weight %.

0.24 kg of oil-furnace carbon black (CB2, pH: 2.5, nitrogen adsorption specific surface area: 120 m$^2$/g, DBP absorption: 105 ml/100 g, volatile matter content: 3.9 weight %), which was the same as that used in Example 2, and 1.8 kg of N-methyl-2-pyrrolidone were added to the thus-obtained solution, and the carbon black was uniformly dispersed therein using a ball mill, obtaining a carbon black-dispersed polyimide precursor solution composition E (hereunder, referred to as precursor solution composition E). Precursor solution composition E had a solids content of 17.6 weight %, wherein the content of carbon black was 19.3 weight %. The average particle diameter of the carbon black in the solution was 0.26 μm, and the maximum particle diameter was 0.44 μm.

(Production of a Carbon Black-Loaded Polyimide Seamless Belt)

A carbon black-loaded polyimide seamless belt (average thickness: 76 μm) was produced in the same manner as in Example 1, except that precursor solution composition E was used.

Regarding the polyimide seamless belts obtained in Examples 1 to 3 and Comparative Examples 1 and 2 described above, the following properties were evaluated. Tables 1 to 3 show the results.

The measurements of various physical properties were made according to the following methods.

Solids Content of Carbon Black-Dispersed Polyimide Precursor Solution Composition The solids content of the carbon black-dispersed polyimide precursor solution composition was calculated as follows. A sample was precisely weighed in a heat-resistant container such as a metal cup (sample weight A (g)). The sample in the heat-resistant container was placed in an electric oven and dried by heating the container in successively increasing temperature cycles of 120° C.×15 minutes, 180° C.×15 minutes and 300° C.×30 minutes. After drying, the weight of the solid components of the sample was measured (solid weight B (g)). The values A and B were measured for 5 samples (n=5) obtained from the same specimen, and the solids content was determined using the following equation. The average of the 5 samples was used as the solids content.

$$\text{Solids Content} = B/A \times 100(\%)$$

Nitrogen Adsorption Surface Area

The nitrogen adsorption surface area was measured according to JIS K6217 (low-temperature nitrogen adsorption method). In addition, the property data of commercially available carbon were used.

DBP Absorption

DBP absorption was measured according to JIS K6217. In addition, the property data of commercially available carbon were used.

Volatile Content of Carbon Black

The volatile content was measured according to JIS K6221. Specifically, the carbon black was heated at 950° C. for 7 minutes, and the weight percent reduction (weight %) of the carbon black with respect to the original weight was measured.

Carbon Black pH

The pH value was measured based on ASTM D1512.

Particle Size of Carbon Black

The particle size of carbon black in the solution was measured using a laser diffraction/scattering particle size distribution analyzer LA-920 (manufactured by Horiba, Ltd.).

Surface Resistivity of Semiconductive Polyimide Resin Belt

The surface resistivity (SR) was measured using a 400-mm sample cut from the produced semiconductive polyimide resin belt. The resistivity was measured at a total of 12 points, i.e., three equally spaced points along the width direction, and four equally spaced points along the length direction (circumferential direction), using a resistivity meter Hiresta IP•UR probe (manufactured by Mitsubishi Chemical Corporation). The average of these values was used as the surface resistivity of the semiconductive belt. The SR value was measured after applying 500 volts for 10 seconds.

Evaluation of Mechanical Properties

The resulting carbon black-loaded polyimide seamless belt was cut into test pieces (5 mm×40 mm). The tensile strength at yield: $\sigma y$ (MPa), tensile strength at break: $\sigma b$ (MPa) and tensile elongation (%) of the test pieces were measured under the tensile conditions defined by JIS K7127, using an autograph (manufactured by Shimadzu Corporation, AGS-5kNG) at a pulling speed of 50 mm/min. and a temperature of 23° C. Five samples (n=5) obtained from each of the carbon black-loaded polyimide seamless belts were subjected to measurement of each property, and the averages of the measurement values were determined as the values for indicating the properties.

Flatness Measurement

Figure 1:
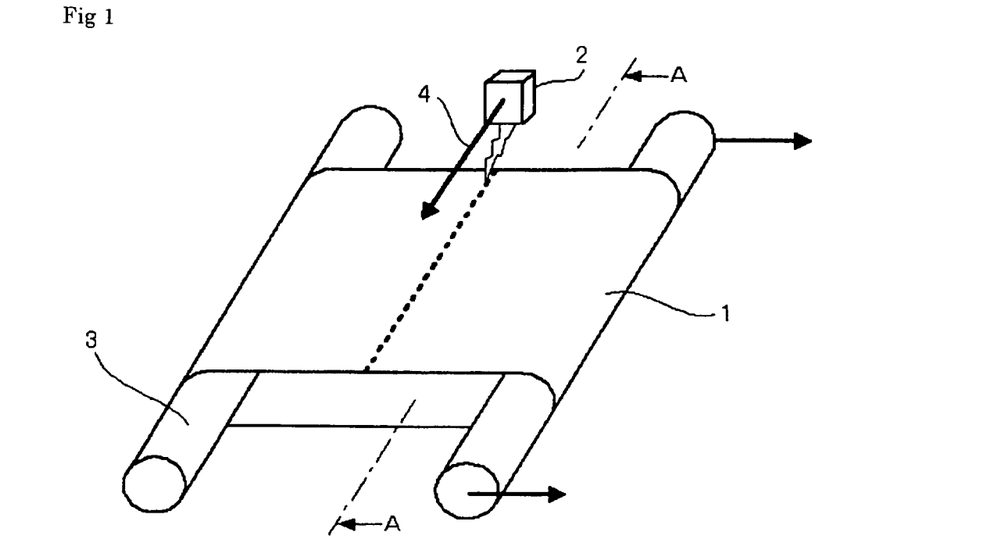
FIG. 1 is a schematic diagram showing the method for measuring flatness.
Figure 2:
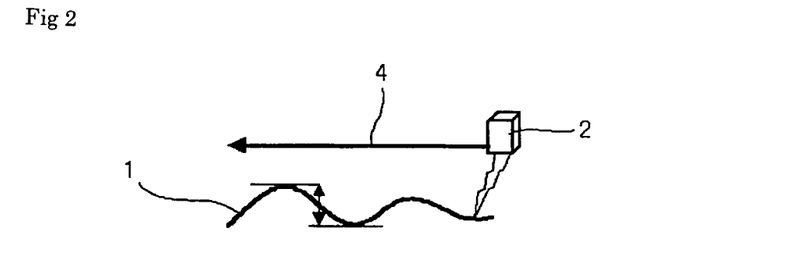
FIG. 2 shows a cross-sectional view along the line AA in FIG. 1.

Each of the resulting carbon black-loaded polyimide seamless belts was cut into pieces having a width of 350 mm. The thus-formed test pieces were stretched at 35 N using two rollers (3) each having a diameter of 30 mm, as shown in FIG. 1. Under such conditions, the amount of displacement on the surface of the belt in the width direction was detected using a laser displacement meter manufactured by Keyence Corporation (Model number: Type KL080) (2). The difference between the maximum value and the minimum value, as shown in FIG. 2, was determined as the flatness of the belt in the width direction. The flatness of the polyimide seamless belts after being subjected to a high voltage test and rotating endurance test was determined in the same manner as described above.

High Voltage Test and Rotating Endurance Test

Figure 3:
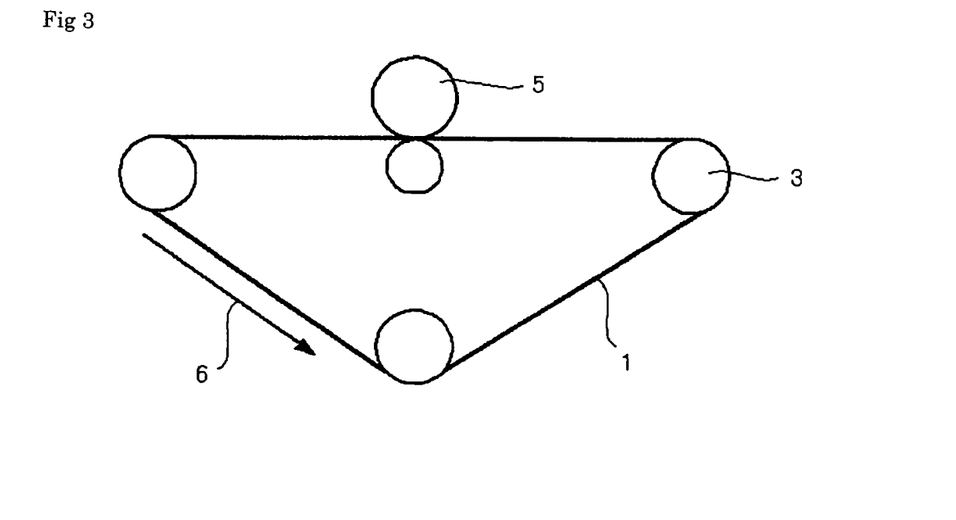
FIG. 3 schematically shows the energizing system for use in a high voltage test and a rotating endurance test.

The high voltage test and rotating endurance test were conducted using an energizing system as shown in FIG. 3 at 10° C., 25% RH, and a traveling speed of 280 mm/s. The belts (1) obtained in the Examples and Comparative Examples were operated for 50 hours while being applied a voltage of 4.0 kV (electrical current: about 40 µA) using a voltage application roller (5). The changes in surface resistivity of the belts (1) were then measured. Thereafter, the rotating endurance after operating for 300 hours at a traveling speed of 280 mm/s without application of voltage was evaluated.

TABLE 1

| | | Components of Polyamic Acid Solution | | Type of Carbon | Amount of Carbon Loaded[1] (wt. %) | Surface Resistivity Ω/sq. |
| | | Dianhydride Component | Diamine Components | | | |
|---|---|---|---|---|---|---|
| Example | 1 | p-TPDA 100 mol % | 4,4'-Diamino-p-terphenyl 70 mol % 4,4'-Diaminodiphenyl ether 30 mol % | CB1 | 21.7 | $2.5 \times 10^{12}$ |
| | 2 | p-TPDA 100 mol % | 4,4'-Diamino-p-terphenyl 50 mol % 4,4'-Bis(4-aminophenoxy)biphenyl 50 mol % | CB2 | 18.1 | $5.0 \times 10^{11}$ |
| | 3 | p-TPDA 100 mol % | 4,4'-Diamino-p-terphenyl 60 mol % Bis[4-(4-aminophenoxy)phenyl]ether 40 mol % | CB3 | 23.7 | $3.5 \times 10^{11}$ |
| Comparative Example | 1 | p-TPDA 100 mol % | p-Phenylenediamine 100 mol % | CB1 | 23.0 | $1.7 \times 10^{12}$ |
| | 2 | p-TPDA 100 mol % | 4,4'-Diaminodiphenyl ether 100 mol % | CB2 | 19.3 | $5.5 \times 10^{12}$ |

[1] Content of carbon black in solid components of the precursor solution composition

TABLE 2

| | | S—S Curve | | Ratio of Tensile | |
| | | Tensile Strength at Yield (MPa) | Tensile Strength at Break (MPa) | Strength at Yield to Tensile Strength at Break | Tensile Elongation (%) |
|---|---|---|---|---|---|
| Example | 1 | 237 | 276 | 1.16 | 28 |
| | 2 | 193 | 247 | 1.28 | 38 |
| | 3 | 186 | 232 | 1.25 | 32 |
| Comparative Example | 1 | 238 | 250 | 1.05 | 18 |
| | 2 | 161 | 191 | 1.18 | 35 |

TABLE 3

| | | Surface Resistivity after High Voltage Test (Ω/sq.) | | Flatness (mm) | |
| | | Measurement Value | Change | Before Evaluation | After Evaluation |
|---|---|---|---|---|---|
| Example | 1 | $2.5 \times 10^{12}$ | No Change | 1.5 | 1.6 |
| | 2 | $5.0 \times 10^{11}$ | No Change | 0.9 | 1.2 |
| | 3 | $3.5 \times 10^{11}$ | No Change | 1.6 | 1.8 |
| Comparative Example | 1 | $1.7 \times 10^{12}$ | No Change | 2.1 | Breakage |
| | 2 | $5.5 \times 10^{12}$ | No Change | 1.5 | 4.5 |

As is clear from Table 3, excellent flatness was obtained in Examples 1 to 3. This is probably because by using terphenyl tetracarboxylic acid and an aromatic diamine having 3 or 4 aromatic rings as the main components, the content of imide group (ring) in the repeating unit of polyimide resin can be reduced, allowing the amount of dehydration at the time of imidization and volumetric shrinkage to be reduced. The belts obtained in Examples 1 to 3 were free from breakage even after being subjected to a 300-hour rotating endurance test, and suffered from little deterioration of flatness. The belt of Comparative Example 2 had a relatively small flatness before evaluation, but a significant deterioration after evaluation. This is probably because the tensile strength at yield was significantly smaller than 180 MPa, causing plastic deformation due to the load applied in the width direction of the belt (dimensional change due to elongation).

The belts in Examples 1 to 3 had no change in surface resistivity (deterioration) even after being subjected to a high voltage test. This is probably because the carbon black is loaded in the resin with a high density; i.e., the carbon black is dispersed as uniformly as possible in the resin.

These results indicate that when the semiconductive polyimide resin belt of the invention is used as such an intermediate transfer belt, it does not incur much change in surface resistivity, even if a large volume of electric current is repeatedly applied, allowing to produce a high-quality transfer image. Furthermore, it is free from breakage even after long-term usage.

| | |
|---|---|
| 1 | Seamless (jointless) tubular film |
| 2 | Laser displacement meter |
| 3 | Roller |
| 4 | Scanning direction of laser displacement meter |
| 5 | Voltage application roller |
| 6 | Belt running direction |

The invention claimed is:

1. A semiconductive polyimide resin belt comprising carbon black and a polyimide resin, the polyimide resin being obtained by imidization of terphenyl-3,3',4,4'-tetracarboxylic dianhydride and an aromatic diamine component, the aromatic diamine component containing 50 mol % or more of an aromatic diamine having 3 and/or 4 aromatic rings based on a total amount of the aromatic diamine component.

2. The semiconductive polyimide resin belt according to claim 1, wherein the aromatic diamine component contains 50 to 90 mol % of 4,4'-diamino-p-terphenyl based on the total amount of the aromatic diamine component.

3. The semiconductive polyimide resin belt according to claim 1, wherein the aromatic diamine component comprises at least one aromatic diamine selected from the group consisting of 4,4'-diaminodiphenyl ether, 4,4'-diamino-p-terphenyl, 4,4'-bis(4-aminophenoxy)biphenyl, and bis[4-(4-aminophenoxy)phenyl]ether.

4. The semiconductive polyimide resin belt according to claim 1, wherein a tensile strength at yield: σy, as recorded by a stress-strain curve measured according to JIS K7113, is 180 MPa or more, and wherein the tensile strength at yield: σy and a tensile strength at break: σb satisfy the following relation:

(tensile strength at break: σb)/(tensile strength at yield: σy)≧1.1.

5. An intermediate transfer belt for an electrophotographic device comprising the semiconductive polyimide resin belt of claim 1, wherein the semiconductive polyimide resin belt has a surface resistivity of $1\times10^8$ to $1\times10^{14}$ Ω/sq.

6. A process for producing the semiconductive polyimide resin belt according to claim 1 by preparing a polyimide precursor solution by reacting terphenyl-3,3',4,4'-tetracarboxylic dianhydride with an aromatic diamine component in an organic polar solvent; dispersing carbon black in the polyimide precursor solution to prepare a carbon black-dispersed polyimide precursor solution composition; molding the carbon black-dispersed polyimide precursor solution composition into a tubular shape by rotational molding; and imidizing the molded product by heat treatment, the process comprising the steps of:
(1) applying the carbon black-dispersed polyimide precursor solution composition to an inner surface of a rotating cylindrical mold;
(2) forming a self-supporting film by applying heat of 80 to 150° C. to the rotating cylindrical mold; and
(3) imidizing the film at a temperature of 300 to 350° C., with the film adhering to the inner surface of the cylindrical mold.

7. The semiconductive polyimide resin belt according to claim 2, wherein the aromatic diamine component comprises at least one aromatic diamine selected from the group consisting of 4,4'-diaminodiphenyl ether, 4,4'-diamino-p-terphenyl, 4,4'-bis(4-aminophenoxy)biphenyl, and bis[4-(4-aminophenoxy)phenyl]ether.

8. The semiconductive polyimide resin belt according to claim 2, wherein a tensile strength at yield: σy, as recorded by a stress-strain curve measured according to JIS K7113, is 180 MPa or more, and wherein the tensile strength at yield: σy and a tensile strength at break: σb satisfy the following relation:

(tensile strength at break: σb)/(tensile strength at yield: σy)≧1.1.

9. The semiconductive polyimide resin belt according to claim 3, wherein a tensile strength at yield: σy, as recorded by a stress-strain curve measured according to JIS K7113, is 180 MPa or more, and wherein the tensile strength at yield: σy and a tensile strength at break: σb satisfy the following relation:

(tensile strength at break: σb)/(tensile strength at yield: σy)≧1.1.

10. The semiconductive polyimide resin belt according to claim 7, wherein a tensile strength at yield: σy, as recorded by a stress-strain curve measured according to JIS K7113, is 180 MPa or more, and wherein the tensile strength at yield: σy and a tensile strength at break: σb satisfy the following relation:

(tensile strength at break: σb)/(tensile strength at yield: σy)≧1.1.

11. An intermediate transfer belt for an electrophotographic device comprising the semiconductive polyimide resin belt of claim 2, wherein the semiconductive polyimide resin belt has a surface resistivity of $1\times10^8$ to $1\times10^{14}$ Ω/sq.

12. An intermediate transfer belt for an electrophotographic device comprising the semiconductive polyimide resin belt of claim 3, wherein the semiconductive polyimide resin belt has a surface resistivity of $1\times10^8$ to $1\times10^{14}$ Ω/sq.

13. An intermediate transfer belt for an electrophotographic device comprising the semiconductive polyimide resin belt of claim 4, wherein the semiconductive polyimide resin belt has a surface resistivity of $1\times10^8$ to $1\times10^{14}$ Ω/sq.

14. An intermediate transfer belt for an electrophotographic device comprising the semiconductive polyimide resin belt of claim 7, wherein the semiconductive polyimide resin belt has a surface resistivity of $1\times10^8$ to $1\times10^{14}$ Ω/sq.

15. An intermediate transfer belt for an electrophotographic device comprising the semiconductive polyimide resin belt of claim 8, wherein the semiconductive polyimide resin belt has a surface resistivity of $1\times10^8$ to $1\times10^{14}$ Ω/sq.

16. An intermediate transfer belt for an electrophotographic device comprising the semiconductive polyimide resin belt of claim 9, wherein the semiconductive polyimide resin belt has a surface resistivity of $1\times10^8$ to $1\times10^{14}$ Ω/sq.

17. An intermediate transfer belt for an electrophotographic device comprising the semiconductive polyimide resin belt of claim 10, wherein the semiconductive polyimide resin belt has a surface resistivity of $1\times10^8$ to $1\times10^{14}$ Ω/sq.

* * * * *